United States Patent [19]

Bright

[11] Patent Number: 5,247,576

[45] Date of Patent: Sep. 21, 1993

[54] KEY VARIABLE IDENTIFICATION METHOD

[75] Inventor: Michael W. Bright, Arlington Heights, Ill.

[73] Assignee: Motorola, Inc., Schaumburg, Ill.

[21] Appl. No.: 661,792

[22] Filed: Feb. 27, 1991

[51] Int. Cl.⁵ .............................................. H04L 9/00
[52] U.S. Cl. ...................................... 380/21; 380/23; 375/1
[58] Field of Search ......................... 380/21, 23; 375/1

[56] References Cited

U.S. PATENT DOCUMENTS

| | | | |
|---|---|---|---|
| 4,794,644 | 12/1988 | Philip et al. | 380/21 |
| 4,850,017 | 7/1989 | Matyas, Jr. et al. | 380/21 |
| 4,890,321 | 12/1989 | Seth-Smith et al. | 380/21 |
| 5,029,208 | 7/1991 | Tanaka | 380/21 |

Primary Examiner—David Cain

Attorney, Agent, or Firm—Timothy W. Markison

[57] ABSTRACT

In a communication system that includes a plurality of communication units, a communication resource allocator, and a limited number of transceivers that transceive information amongst the plurality of communication units via a limited number of communication resources, at least some of the information is transceived utilizing encryption means. To enhance the security of the communication system multiple keys are employed wherein a first communication unit transmits information identifying a particular key of the plurality of keys. Upon receiving the identifying information, at least a second communication unit looks up the particular key that is represented by the identifying information. Once the key is determined, it is loaded into a cryptographic circuit of the second communication unit enabling the second communication unit to receive encrypted messages from the first communication unit.

8 Claims, 2 Drawing Sheets

KEY VARIABLE IDENTIFICATION METHOD

FIELD OF THE INVENTION

This invention relates generally to encrypted communication systems that utilize multiple keys and, in particular, to a method for varying which key is being utilized by transmitting identification information of the key to parties in a communication.

BACKGROUND OF THE INVENTION

Encrypted voice and data communication systems are known to comprise a plurality of communication units, a limited number of transceivers that transceive audio and data information amongst the plurality of communication units via a limited number of communication resources, and a communication resource allocator. (A communication resource may be a carrier frequency, frequency pairs, a TDM slot, etc.) Encrypted voice and data communication systems, or secure communication systems, provide secure communication between two or more communication units by sharing a particular piece of information between them. The particular piece of information is generally known as an encryption key variable, or key, which allows only those communication units possessing it to properly transmit and receive encrypted messages.

To enhance the security of the secure communication systems, the keys are periodically changed. For example, the key may be changed weekly or monthly, depending on the desired security of the secure communication system. To further enhance security of communications within the secure communication system, multiple keys may used by the plurality of communication units. By having each of the plurality of communication units able to use one of the plurality of keys, the ability for an unauthorized user to decipher a secure communication is greatly reduced.

When a communication unit receives an encryption message that it does not have the proper key for, the user of the communication unit would be presented with a garbled signal. To prevent the garbled signal from being presented to the user, the communication unit comprises a proper code detection circuit. The proper code detection circuit is used to squelch, or mute, the receiver when ever a message is received that is encrypted with a different key than the communication unit is utilizing. The proper code detection circuit, when it determines that the received message is encrypted with the same key as the communication unit is utilizing, unmutes the receiver and allows the message to be heard by the user.

As is known in communication systems, communication units are grouped together, wherein the grouping is based on commonality of use. For example, communication units operated by a police department may form one group, while communication units operated by a fire department may form another group. These groups may be further divided into sub-groups; for example, the police group may be further divided into districts. For each group or sub-group, an individual key may be needed to maintain the desired security. Even though each group or sub-group may comprise its own unique key and may share the same communication resource, a situation may arise where an operator of a console may need to communicate with all the groups and sub-groups that are sharing the same communication resource. In such instances, the operator of the console must know what key each group or sub-group was using. In large communication systems, this places a substantial burden on the operator which may distract him or her from more important tasks.

Therefore, a need exists for an automatic way to monitor and utilize multiple keys in a secure communication system.

SUMMARY OF THE INVENTION

These needs and others are substantially met by the key variable identification method disclosed herein. In a communication system that includes a communication resource allocator, a plurality of communication units, a limited number of transceivers that transceive information amongst the plurality of communication units via a limited number of communication resources at least some of the transceived information is encrypted prior to transmission and subsequently decrypted upon reception by selected communication units of the plurality of communication units. To improve the encryption and decryption of at least some of the information, a first communication unit transmits information identifying one of a plurality of encryption codes to produce identifying information. Upon receiving the identification information, at least a second communication unit identifies the one of the plurality of encryption codes from an internal encryption code identification data base. Once the one of the plurality of encryption codes is identified, it is entered into a cryptographic circuit of the second communication unit.

In an aspect of the present invention, the second communication unit utilizes the one of the plurality of encryption codes during a predetermined receive time to transmit messages. If the second communication unit transmits during the predetermined receive time, a predetermined transmit time is initiated, which, during such time, the second communication unit uses the one of the plurality of encryption code. If the second communication unit transmits during the predetermined transmit time, the one of the plurality of encryption codes is used and the predetermined transmit time is reset. Once the predetermined received time, or the predetermined transmit time expires, the second communication unit enters a preselected encryption code into the cryptographic circuit.

DETAILED DESCRIPTION OF A PREFERRED EMBODIMENT

Figure 1:
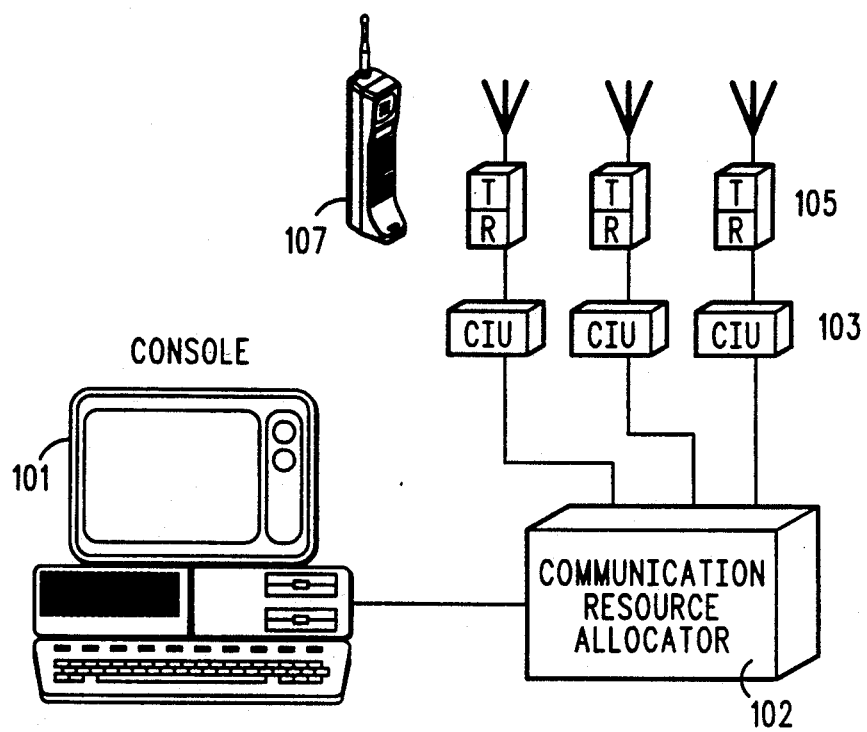
FIG. 1 illustrates a communication system that incorporates the present invention.

FIG. 1 illustrates a communication system that incorporates the present invention. The communication system comprises a plurality of communication units (2 shown, one as a portable or mobile radio (107), and the other as a console (101)), a communication resource allocator (102), and a limited number of transceivers (105). The transceivers (105), interface with the communication resource allocator via a console interface unit (103). The console interface unit (CIU) is equipped with a multi key option and an encode/decode base station, such as an MFF5000 base station with multi key options.

Figure 2:
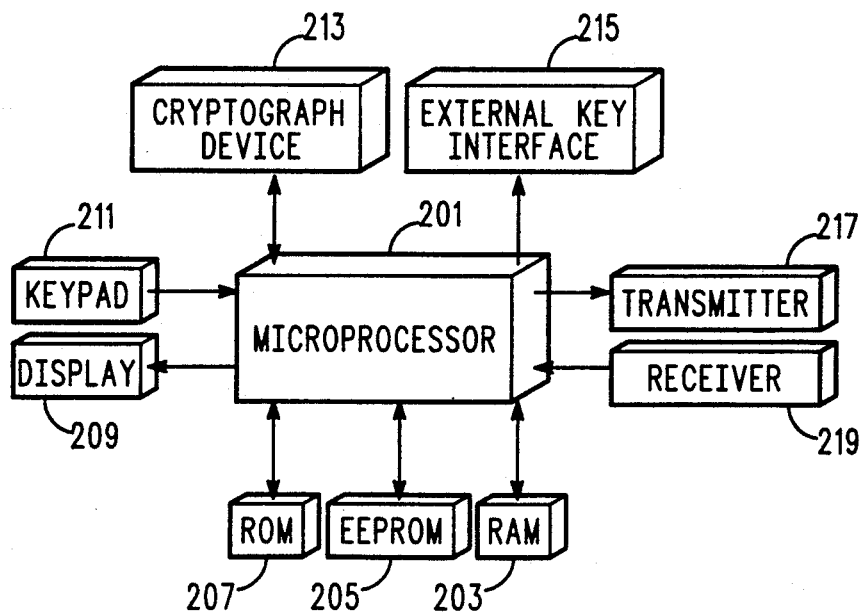
FIG. 2 illustrates a schematic diagram of a portion of a communication unit that incorporates the present invention.

FIG. 2 illustrates a schematic diagram of a portion of a communication unit. The communication unit comprises a microprocessor (201), RAM (203), and EEPROM (205), ROM (207), a display (209), a keypad (211), a cryptographic device, or circuit, (213), an external key interface (215), a transmitter (217), and a receiver (219). The external key interface (215) allows key information to be down loaded from a key management controller (KMC) such that the keys may be utilized by the communication unit.

Generally, the present invention allows an operator of a communication unit to select communication units that it desires to communicate with in a secure manner. To achieve this, the initiating, or first, communication unit, transmits key identification information to the selected communication units. The key identification information represents the key that the first communication unit has selected. Upon receiving the key identification information, each of the selected communication units deciphers it to determine the selected key. The selected key is then entered into a cryptographic circuit within each of the selected communication units, thus enabling a secure communication to take place. By transmitting key identification information, as opposed to the key itself, the security of the forthcoming communication is enhance because it is virtually impossible to decipher the encryption code based on key identification information alone.

Figure 3:
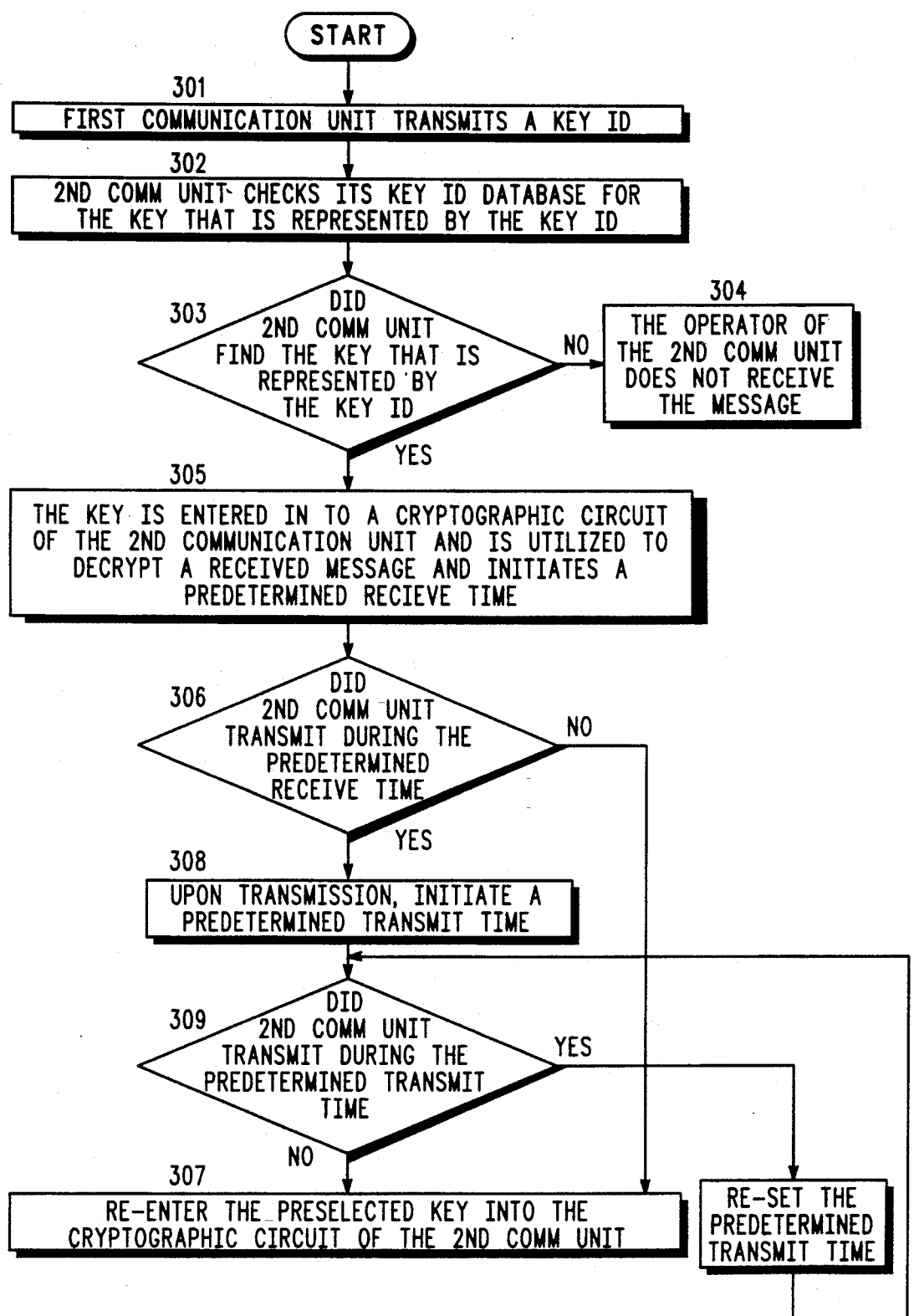
FIG. 3 illustrates a logical diagram that may be used to implement the present invention.

FIG. 3 illustrates the present invention in more detail. After selecting at least a second communication unit and a key, a first communication unit transmits an encryption code, or key, identification information to the second communication unit. The identifying information may be transmitted in a data message via a signalling protocol such as MDC 1200 available from Motorola Inc. By flagging at least one byte of a general instruction block, the second communication unit is notified that this block contains identifying information of the encryption code, or key. The selection of the second communication unit and the key is done as in prior art systems and no further discussion will be presented on this point.

Once the first communication unit transmits the key identification information, the second communication unit checks its internal encryption code identification data base for one of the plurality of encryption codes, or keys, that the identifying information represents (302). If the second communication unit does not identify the particular encryption code (303), the operator of the second communication may not participate in the secure communication (304). If the second communication unit did identify the encryption code (303), the encryption code, or key, is entered into the cryptographic circuit and utilized to decrypt a message transmitted from the first communication unit and initiates a predetermined receive time (305). The predetermined receive time may be programmable up to 10 seconds in 200 millisecond increments such that during the predetermined receive time, the second communication unit utilizes the identified key to transmit message which may be audio or data messages.

If the second communication unit did not transmit a message during the predetermined receive time (306), a preselected encryption code is entered into the cryptographic circuit (307) and the process ends. The preselected encryption code is an encryption code that had been selected by the operator of the second communication unit prior to the initiation of this procedure or is the encryption code that has been automatically down loaded by the system.

If the second communication unit transmits a message during the predetermined receive time (306), a predetermined transmit time is initiated (308). The predetermined transmit time may be programmed similarly to the predetermined receive time. If the second communication unit transmits a message during the predetermined transmit time (309), the predetermined transmit time is reset such that the key is held onto for another possible transmission (310). The second communication unit may transmit a message to the first communication unit or to any other communication unit using the selected key, nevertheless, it is assumed that most transmissions within the predetermined receive and predetermined transmit times will be to the first communication unit. If the second communication unit does not transmit a message during the predetermined transmit time (309), the second communication unit enters the preselected key in to the cryptographic circuit (307) and the process ends.

The above process was primarily described for a one to one communication, however, the above procedure is equally applicable to group communications. In a group communication, each of the selected communication units would perform the above process. And each of the selected communication units would be able to communicate to the other selected communication units utilizing the selected encryption code, or the one of the plurality of encryption codes that is identified by the identifying information.

What is claimed is:

1. In a communication system that includes a communication resource allocator, a plurality of communication units, a limited number of transceivers that transceive information amongst the plurality of communication units via a limited number of communication resources, wherein at least some of the information is encrypted prior to transmission and subsequently decrypted upon reception by selected communication units of the plurality of communication units, a method for improving encryption and decryption of the at least some of the information, the method comprises the steps of:

a) transmitting, by a first communication unit of the plurality of communication units, information identifying one of a plurality of encryption codes to produce identifying information;
   b) upon receipt of the identifying information by at least a second communication unit of the selected communication units, identifying the one of the plurality of encryption codes from the identifying information when the second communication unit contains the identifying information in an encryption code identifying database; and
   c) when the second communication unit contains the identifying information in the encryption code identifying database, entering the one of the plurality of encryption codes in to a cryptographic circuit; and
   d) disabling a mute circuit after the one of the plurality of encryption codes is entered in to the cryptographic circuit.

2. In a communication system that includes a communication resource allocator, a plurality of communication units, a limited number of transceivers that transceive information amongst the plurality of communication units via a limited number of communication resources, wherein at least some of the information is encrypted prior to transmission and subsequently decrypted upon reception by selected communication units of the plurality of communication units, a method for improving encryption and decryption of the at least some of the information, the method comprises the steps of:

a) transmitting, by a first communication unit of the plurality of communication units, information identifying one of a plurality of encryption codes to produce identifying information;

b) upon receipt of the identifying information by at least a second communication unit of the selected communication units, identifying the one of the plurality of encryption codes from the identifying information when the second communication unit contains the identifying information in an encryption code identifying database;

c) when the second communication unit contains the identifying information in the encryption code identifying database, entering the one of the plurality of encryption codes in to a cryptographic circuit; and d) overriding a preselected encryption code of the plurality of encryption codes when entering the one of the encryption codes in to the cryptographic circuit.

3. The method of claim 2 further comprises, prior to overriding the preselected encryption code, storing the preselected encryption code.

4. The method of claim 3 further comprises transmitting, by the second communication unit during a predetermined transmit time, information to the first communication unit, wherein the information is encrypted per the one of the encryption codes.

5. The method of claim 4 further comprises entering the preselected encryption code in to the cryptographic circuit after the predetermined transmit time expires.

6. In the method of claim 3, step (c) further comprises entering the one of the plurality of encryption codes in to the cryptographic circuit for a predetermined receive time.

7. The method of claim 6 further comprises entering the preselected encryption code in to the cryptographic circuit when the predetermined received time expires.

8. In a communication system that includes a communication resource allocator, a plurality of communication units, a limited number of transceivers that transceive information amongst the plurality of communication units via a limited number of communication resources, wherein at least some of the information is encrypted prior to transmission and subsequently decrypted upon reception by selected communication units of the plurality of communication units, and wherein at least some of the communication units transmit information identifying one of a plurality of encryption codes prior to transmitting encryption information, each of the at least some of the plurality of communication units comprises:

identifying database means for storing identifying information of at least some of the plurality of encryption codes and the at least some of the plurality of encryption codes;

receiving means, operably associated with the identifying database means, for receiving identifying information;

transmitting means, operably associated with the identifying database means, for transmitting identifying information; and timer means, operably associated with the identifying database means, for determining a predetermined receive time and a predetermined transmit time.

* * * * *